United States Statutory Invention Registration [19]

[11] Reg. Number: H1003

Ishiwata et al. [43] Published: Dec. 3, 1991

[54] PROCESS FOR PRODUCING PHOTOGRAPHIC MATERIALS

[76] Inventors: Masao Ishiwata; Norio Kawame; Takeshi Sakurai, all of c/o Konica Corporation No. 28, Horinouchi, Odawara-shi Kanagawa-ken; Mieji Nakano; Kazuhide Tamazawa; Nobuyuki Kimura; Toshio Saito; Gentaro Hada, all of c/o Konica Corporation No. 1, Sakura-machi, Hino-shi Tokyo 191, all of Japan

[21] Appl. No.: 480,279

[22] Filed: Feb. 15, 1990

[30] Foreign Application Priority Data

Feb. 17, 1989 [JP] Japan ..... 1-36060

[51] Int. Cl.[5] ..... B05D 1/36; B05D 1/30; B05D 1/02; G03C 1/46

[52] U.S. Cl. ..... 430/502; 430/935; 427/414; 427/420; 427/424

[58] Field of Search ..... 430/935; 427/414, 420, 427/424

[56] References Cited

U.S. PATENT DOCUMENTS

| | | | |
|---|---|---|---|
| 4,001,024 | 1/1977 | Dittman et al. | 430/536 |
| 4,113,903 | 9/1978 | Chornski | 430/935 |
| 4,525,392 | 6/1985 | Ishizaki et al. | 427/420 |
| 4,569,863 | 2/1986 | Koepke et al. | 427/420 |
| 4,791,004 | 12/1988 | Suzuki et al. | 427/420 |
| 4,863,765 | 9/1989 | Ishizaka | 427/420 |
| 4,922,851 | 5/1990 | Morikawa et al. | 427/420 |
| 4,933,215 | 6/1990 | Naruse et al. | 427/420 |
| 4,942,068 | 7/1990 | Schweicher et al. | 427/420 |

OTHER PUBLICATIONS

Derwent Abstracts of J60 126648, "Photographic Material Prepn . . . , " 7/6/85, Kunishiroku Photo.

*Primary Examiner*—Robert L. Stoll
*Assistant Examiner*—Cynthia Harris

[57] ABSTRACT

An improved process for producing a photographic material in which an assembly of superposed liquid photographic layers is coated onto the surface of a moving base support in such a way that the properties of the liquid photographic layers being coated are evaluated by their dynamic surface tensions.

5 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PROCESS FOR PRODUCING PHOTOGRAPHIC MATERIALS

BACKGROUND OF THE INVENTION

The present invention relates to a process for producing a photographic material, in which process a plurality of photographic coating solutions in the liquid state that usually contain hydrophilic colloids and that exhibit viscous nature are simultaneously coated onto the surface of a moving base as it is continuously unwound from a supply roll.

Many methods are known that are capable of coating the surface of a base with photographic layers that make up photographic materials and that exhibit or supplement various photographic capabilities. Rigid bases such as glass plates are transported as coating solutions are cast onto their surface with the coating thickness being controlled with a caster (called "Giesser" in German). Flexible bases as long as several hundred meters are unwound from a supply roll as coating solutions are applied onto their surface of the web. Dip coating is the simplest method practiced in commercial operations. Double roll coating is sometimes performed. With a view to controlling the thickness of supplied coatings, adjustments are made for coating speed and viscosity, or correction means such as air doctor knife is also adopted.

From the viewpoint of production rate, these methods are not suitable for applying multiple coatings as in color photographic materials which have ten-odd photographic layers formed in superposition. Instead, sliding hopper coating or curtain coating which are capable of simultaneous application of multiple layers are employed. In the curtain-coating process, a coating solution is delivered from a discharge-slot opening in a falling sheet or curtain to the surface of a moving base which is unwound from a supply roll. As the base moves through the curtain, a broad beaded film forms on the base surface to provide a coating. However, the curtain-coating process involves considerable difficulty in forming and maintaining a stable bead and sliding hopper coating is preferred today as an industrial process.

An apparatus for performing the sliding hopper coating process has an inclined sliding surface provided with a plurality of discharge slots, from which different coating solutions emerge to form respective coating layers that go down the sliding surface in such a way that one coating layer overlaps another that is to form an underlying layer in the final product (i.e., photographic material). When a predetermined number of coatings are superposed, a chain or small beads are formed to provide multiple coatings on the moving base.

Multiple-bead coating by the sliding hopper coating process are described in many prior patents such as JP-A-52-115214 (the term "JP-A" as used herein means an "unexamined published Japanese patent application"), JP-A-54-1350 and JP-A-56-108566. In fact, tremendous efforts have been made in order to form satisfactory photographic layers by this method. For example, JP-A-52-115214 proposed that the coating solution for the layer located the closest to the support of a photographic material be applied in a quantity of 2–12 $cm^3/m^2$ at a viscosity of 1–8 cPs. JP-A-56-108566 made a proposal on the viscosity, $\eta_0$ of the coating solution for said bottommost photographic layer. The proposal states that when coatings are applied at low shear rate, $\eta_0$ should satisfy the tolerable range of $\eta_0=\eta_1\pm10$ (CPS) where $\eta_1$ is the viscosity of the coating solution for the layer which is to lie just above said bottommost photographic layer, and that when coatings are applied at high shear rate, the relationship $\eta_0<\eta_1$ should be satisfied. In spite of these efforts, however, the coatings of photographic layers that are formed by the sliding hopper coating process often involve various defects such as uneven thickness and repellency spots.

Under these circumstances, a new process for producing a photographic material was proposed, in which process a plurality of liquid layers were coated in superposition on the surface of a moving base, with the coating solution for the topmost layer of the photographic material being adjusted to have a lower surface tension than the coating solution for any other layers (JP-A-60-126648). However, even this method is not completely satisfactory and studies to make further improvements are under way.

SUMMARY OF THE INVENTION

An object, therefore, of the present invention is to provide a process for producing a photographic material of high quality by a sliding hopper coating method in such a way that the occurrence of coating defects such as repellency spots, uneven thickness and streaking is substantially prevented.

This object of the present invention can be attained by a process in which an assembly of superposed liquid photographic layers is coated onto the surface of a moving support in such a way that the properties of the liquid photographic layers being coated are evaluated by their dynamic surface tensions.

In a preferred embodiment, the topmost layer of said assembly is formed of a coating solution that has a lower dynamic surface tension than coating solutions for any other layers of the assembly.

In a more preferred embodiment, the coating solution for the topmost layer has a dynamic surface tension which is at least 5 dynes/cm (38° C.) lower than those of the coating solutions for any other layers of the assembly. It is also preferred that the coating solution for a layer that is to be situated beneath the topmost layer has a dynamic surface tension that differs by no more than 5 dynes/cm (38° C.) from the dynamic surface tension of the coating solution for an adjacent layer.

The composition of photographic coating solutions is not determined solely by the coating conditions, or the above-stated conditions for dynamic surface tension. In practice, the composition of photographic coating solutions is often determined in consideration of the requirements for other photographic characteristics. For instance, the dynamic surface tension of the assembly of superposed coating solutions will not change monotonically but is substantially inverted in a certain coating solution (e.g. 41 dynes/cm, 44 dynes/cm, 54 dynes/cm and 40 dynes/cm in the order of layer arrangement, which the first-mentioned value being for the bottommost layer). In such a case, further studies have to be made with respect to the relationship between the dynamic surface tension of the coating solution for the topmost layer and the minimum dynamic surface tension of the coating solutions for any other layers.

In another preferred embodiment, the present invention relates to a process for producing a photographic material by coating the surface of a moving support with an assembly of at least three superposed liquid photographic layers in which the dynamic surface tension is substantially inverted in a certain intermediate layer of the assembly. This process is characterized in that the topmost layer of the assembly is formed of a coating solution the dynamic surface tension of which is adjusted to be at least 5 dynes/cm smaller than the minimum dynamic surface tension of the coating solutions for any other layers.

The expression "the dynamic surface tension is substantially inverted in a certain intermediate layer of the assembly" refers to the case where the dynamic surface tension of the assembly does not change monotonically but a peak occurs in a certain intermediate layer. In such a case, the present invention proves to be particularly effective if the difference between said peak value and the dynamic surface tension of any adjacent layer (i.e., if the third layer has a maximum dynamic surface tension, the difference is obtained by subtracting the dynamic surface tension of the second layer from that of the third layer) is at least 3 dynes/cm.

The term "liquid layer" as used herein means a layer that is made of a material capable of changing from a sol state to a gel state and that is in a sol state, or a layer made of a fluid that is viscous but which yet retains fluidity. A layer of gelatin solution is a typical example of this "liquid layer".

A method of measuring the dynamic surface tension is described in J. Fluid Mech., vol. 112, pp. 443–458, 1981 and may be briefly explained below with reference to FIG. 1. A solution to be measured is allowed to fall from a die 31 forming a liquid film or curtain by means of guide rods 32. When a pin-shaped obstacle is applied to the liquid film, a turbulence occurs in the film at an angle of $\theta$. On the basis of this angle of turbulence $\theta$, flow quantity Q and other parameters, the dynamic surface tension, $\sigma$, of the solution can be determined from the following equations:

$$\sigma = \tfrac{1}{2}\rho Q u \sin^2\theta$$

$$u^2 = U_o^2 + 2gH$$

$$u_o = (Q^2\rho g/3\mu)^{\frac{1}{3}}$$

where u: flow rate at the point of measurement;

$u_o$: initial velocity;

H: height of the obstacle;

$\rho$: density of the solution;

$\mu$: viscosity of the solution;

Q: flow quantity per unit width.

The conditions of measurement are as follows: solution's temperature, 38±1.5° C.; curtain width, 147 mm; obstacle's height, 42 mm. In the case where the dynamic surface tension is substantially inverted in a certain intermediate layer, the conditions for measurement are adjusted to the following: solution's temperature, 40° C.; curtain width, 68 mm; obstacle's height, 41.5 mm. In a preferred embodiment of the present invention, the dynamic surface tension of the coating solution for the topmost layer as measured under those conditions is at least 5 dynes/cm lower than the minimum dynamic surface tension of the coating solutions for any other layers.

In the method of measurement described above, variations within about ±1.5 dynes/cm are permissible.

DETAILED DESCRIPTION OF THE INVENTION

The present invention is described below in detail.

Figure 1:
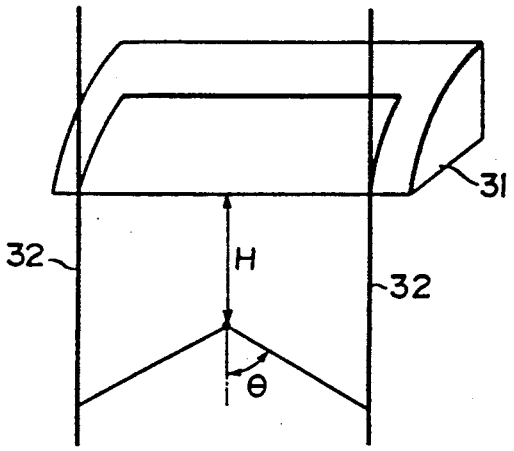
FIG. 1 is a sketch showing the principle of the measurement of dynamic surface tension.
Figure 2:
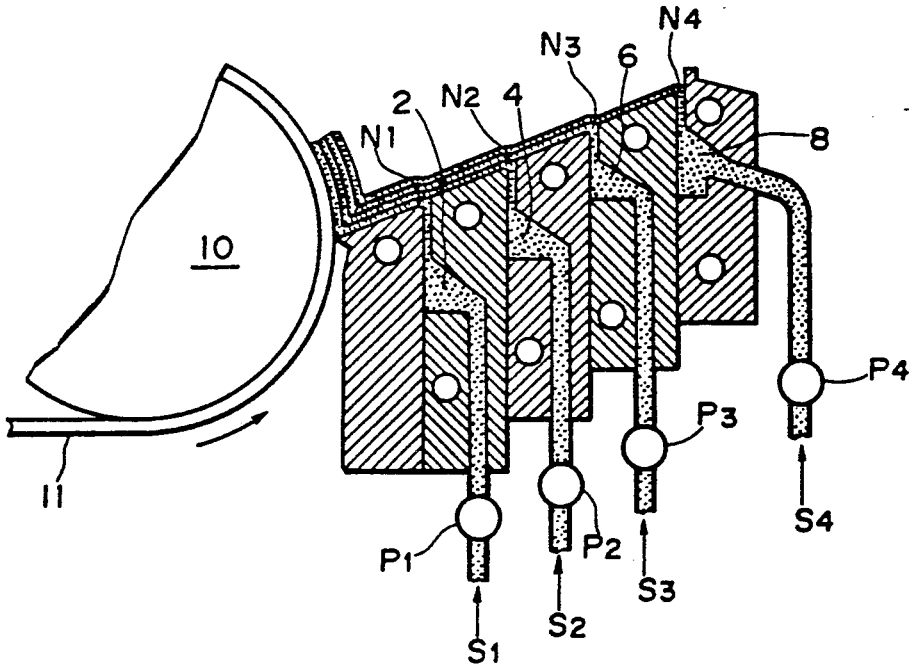
FIG. 2 is a diagrammatic cross section of a sliding hopper coater suitable for use in implementing the process of the present invention to form four layers in superposition.

FIG. 2 shows diagrammatically a sliding hopper coater suitable for use in implementing the process of the present invention. Coating solutions $S_1$, $S_2$, $S_3$ and $S_4$ properly adjusted with respect to photographic capabilities and coating properties are supplied in predetermined flow quantities into respective cavities 2, 4, 6 and 8 by means of associated metering pumps $P_1$, $P_2$, $P_3$ and $P_4$; the coating solutions pass through vertical slots and are delivered to a downwardly inclined sliding surface through discharge slots $N_1$, $N_2$, $N_3$ and $N_4$; the coating solutions then flow down the sliding surface, with one solution lying above another to form coating beads, and the resulting assembly of layers is transferred onto a support 11 backed up with a roller 10.

In the multiple coating system with the sliding hopper coater described above, various types of interface will develop; a solid-liquid interface formed between the sliding surface and a coating solution, a liquid-liquid interface formed between coating solutions in superposition, and a gas-liquid interface formed between the surface of the assembly of superposed coating layers (i.e., the surface of the topmost layer) and the ambient atmosphere. These interfaces develop various phenomena. First, the superposition of coating layers on the sliding surface is already a wet-on-wet process and, in addition to physical properties associated with the casting of coating films such as the viscosity of coating solution themselves which form liquid layers, the interfacial characteristics of the surface of liquid layers formed of the coating solutions are already involved as exemplified by the wetting of the sliding surface with coating solutions and the difficulty in superposing coating solutions in layers on account of their repelling one another. Second, when the assembly of coating layers is transferred from the sliding surface onto the surface of the support after forming coating beads, not only the shear force to be exerted upon the structure of the assembly itself but also the shear force to be exerted upon the surface of liquid layers must be considered. Third, when the liquid layers forming coating beads are coated on the surface of the support, the coating solutions in the liquid state are wrapped with a thin flat envelope formed by the support and the surface of the assembly (i.e., the surface of its topmost layer) and will move about within the envelope under gravity or by mechanical vibration. The surface of the assembly will crack and subsequently shrink on account of its internal movement and under the weight of the surface itself. These phenomena of cracking and shrinking will affect the liquid coating solution beneath the surface of the assembly to induce the occurrence of uneven coatings. Further, they combine with the difficulty in superposing coating solutions in layers, producing repellency spots. It is believed that these and other dynamic phenomena associated with interfaces are repeated when liquid layers are coated in superposition by means of a sliding hopper coater.

The present inventors found that in order to insure that multiple bead coatings are formed by sliding hopper coating without producing coating defects but providing coatings of high quality with high producibility, not only was it necessary to control physical properties such as viscosity that were related to the shear resistance and castability of the assembly of superposed coating layers but also its dynamic surface tension had to be considered. There has been no prior art disclosure that specifically discussed dynamic surface tension in order to develop a measure for dealing with the defects that occur in the multiple bead coating operation. The present inventors conducted intensive studies on coating defects, in particular, uneven coating thickness and repellency spots and found that dynamic surface tension was a major factor that influenced the occurrence of coating defects. Stated more specifically, uneven coating thickness is highly likely to occur if the dynamic surface tension of the assembly of superposed coating layers is either too great or small or if it is inverted in a certain intermediate layer of the assembly, whereas repellency spots are likely to occur if the dynamic surface tension of the assembly is too great. Interestingly enough, the range over which the occurrence of uneven coating thickness is minimum overlaps the range where repellency spots are less likely to occur.

The present inventors also found that in coating an assembly of superposed liquid layers, the occurrence of uneven coating thickness and repellency spots could be substantially avoided when the dynamic surface tension of the coating solution for forming the surface of the assembly (i.e., the surface of the topmost layer) was smaller, preferably by at least 5 dynes/cm, than the dynamic surface tension of the coating solution for any of the internal layers of the assembly. The reason for this would be that the thin flat envelope described above was formed and maintained in a stable manner. Hence, according to the present invention, the dynamic surface tension of the coating solution for the topmost layer is held within the above-mentioned range over which the occurrence of uneven coating thickness is minimum, and at the same time, it is controlled to be smaller than the dynamic surface tension of any of the coating solutions for the other layers. In the present invention, the range of the dynamic surface tension of the surface of the assembly of superposed liquid coating layers over which the occurrence of uneven coating thickness and repellency spots can be held minimum is from 20 to 50 dynes/cm, preferably from 25 to 45 dynes/cm. Preferably, the dynamic surface tension of the coating solution for each of the constituent layers of said assembly is within the above-stated range, and more preferably the dynamic surface tension of the coating solution for the topmost layer of the assembly which is within this range is smaller than the dynamic surface tension of any of the coating solutions for the other layers by a value of at least 5 dynes/cm.

Surfactants are used in the present invention to reduce the dynamic surface tension of coating solutions. While anionic, nonionic, cationic and amphoteric surfactants may be used, anionic and nonionic surfactants are used with particular advantage. Illustrative anionic surfactants include: aliphatic acid salts, abietic acid salts, hydroxyalkanesulfonic acid salts, alkanesulfonic acid salts, dialkylsulfosuccinic acid salts, straight-chained alkylbenzenesulfonic acid salts, branched alkylbenzenesulfonic acid salts, alkylnaphthalene sulfonic acid, alkylphenoxypolyoxyethylene propylsulfonic acid salts, polyoxyethylenealkylsulfophenyl ether salts, N-methyl-N-oleyltaurine sodium salts, N-alkylsulfosuccinic acid monoamide disodium salts, petroleum sulfonates, sulfated castor oil, sulfated tallow, sulfate ester salts of aliphatic acid alkyl esters, alkyl sulfate ester salts, polyoxyethylene alkylether sulfate ester salts, aliphatic acid monoglyceride sulfate ester salts, polyoxyethylene alkylphenylether sulfate ester salts, polyoxyethylene styrylphenylether sulfate ester salts, alkyl phosphate ester salts, polyoxyethylene alkylether phosphate ester salts, polyoxyethylene alkylphenylether phosphate ester salts, partially saponified styrene-maleic anhydride copolymers, partially saponified olefin-maleic anhydride copolymers, and naphthalenesulfonic acid salts condensed with formaldehyde. Among these compounds, dialkylsulfosuccinic acid salts, alkylsulfate ester salts and alkylnaphthalenesulfonic acid salts are used with particular preference.

Illustrative nonionic surfactants include: polyoxyethylene alkyl ethers, polyoxyethylene alkylphenyl ethers, polyoxyethylene polystyryl phenyl ethers, polyoxyethylene polyoxypropylene alkyl ethers, partial esters of glycerin and aliphatic acid, partial esters of sorbitan and aliphatic acid, partial esters of pentaerythritol and aliphatic acids, monoaliphatic acid esters of propylene glycol, partial esters of sucrose and aliphatic acids, partial esters of polyoxyethylene sorbitan and aliphatic acids, partial esters of polyoxyethylene sorbitol and aliphatic acids, esters of polyethylene glycol and aliphatic acids, partial esters of polyglycerin and aliphatic acids, polyoxyethylenated castor oils, partial esters of polyoxyethylene glycerin and aliphatic acids, aliphatic acid diethanol amides, N,N-bis-2-hydroxyalkylamines, polyoxyethylene trialkylamines, triethanolamine aliphatic acid esters, and trialkylamine oxides. Among these compounds, polyoxyethylene alkylphenyl ethers and polyoxyethylene/polyoxypropylene block polymers.

Illustrative cationic surfactants include alkylamine salts, quaternary ammonium salts, polyoxyethylene-alkylamine salts and polyethylenepolyamine derivatives.

In selecting suitable surfactants, a field test is conducted with coating solutions in consideration of the HLB (hydrophilic-hydrophobic balance) value and the molecular structural characteristics of hydrophilic and hydrophobic groups and the results are checked for the occurrence of salting-out or cloud point or the degree of foaming (suds).

The dynamic surface tension of coating solutions will vary with the concentration and type of hydrophilic colloid materials (e.g. gelatin) and other organic materials or those inorganic materials which may cause some effects that are to be contained in the coating solutions. Thus, the amount in which surfactants should be added may be determined empirically using actual coating solutions.

Hydrophilic colloids that can be used in the present invention are not limited to gelatin and various gelatin derivatives are also usable, such as: gelatin derivatives formed by reacting gelatin with aromatic sulfonyl chlorides, acid chlorides, acid anhydrides, isocyanates or 1,4-diketones, gelatin derivatives formed by reacting gelatin with trimellitic anhydride, gelatin derivatives formed by reacting gelatin with organic acids having active halogens, gelatin derivatives formed by reacting gelatin with aromatic glycidyl ether, gelatin derivatives formed by reacting gelatin with maleimide, maleamic acid or unsaturated aliphatic diamides, sulfoalkylated gelatin, polyoxyalkylene derivatives of gelatin, and gelatin having high-molecular weight compounds grafted thereto. Also useful are synthetic hydrophilic high-molecular weight materials, and natural hydrophilic high-molecular weight materials other than gelatin, such as casein, agar and polysaccharides (e.g. alginic acid), which may be used either independently or as admixtures.

In producing the photographic material of the present invention, any of the silver halide emulsions commonly employed in the art may be used. They may contain, for example, the crystals of silver chloride, silver bromide, silver iodobromide, silver chlorobromide, silver chloroiodobromide or silver chloroiodobromide, or mixtures of these crystals. The silver halide emulsions to be used may be large or small in size and they may be mono- or polydispersed. Silver halide crystals may assume various crystallographic shapes such as cubes, octahedra and mixed epitaxial crystals. The emulsions may be negative, positive or direct positive. They may surface sensitive emulsions which predominantly form a latent image on the surface of silver halide grains, or internal-image emulsions which predominantly form a latent image in the interior of silver halide grains, or they may be of a mixed type.

The silver halides described above may be chemically sensitized with the following: activated gelatin; sulfur sensitizers such as allyl thiocarbamide, thiourea and cystine; selenium sensitizers; reduction sensitizers such as stannous salts, thiourea dioxide and polyamines; noble metal sensitizers such as gold sensitizers (e.g. potassium aurithiocyanate, potassium chloroaurate and 2-aurosulfobenzothiazole methochloride) and water-soluble salts of other noble metals such as ruthenium, rhodium and iridium (e.g. ammonium chloropalladate, potassium chloroplatinate and sodium chloropalladide, certain of which will serve as a sensitizer or an antifoggant depending on the amount in which they are used). These chemical sensitizers may be used either on their own or as admixtures in such a way that gold sensitizers are combined with sulfur sensitizers or selenium sensitizers.

The silver halides may be spectrally sensitized to have sensitivity to light in a desired wavelength range and illustrative spectral sensitizers include cyanine dyes such as zeromethine dyes, monomethine dyes, dimethine dyes and trimethine dyes, and merocyanine dyes. These spectral sensitizers may be used either on their own or as admixtures to effect supersensitization.

In applying the present invention to color photographic materials, common techniques and additives in color photography may be utilized, such as incorporating yellow, magenta and cyan couplers in combination in silver halide emulsions adjusted to have sensitivity to blue, green and red light. Couplers to be used may be of a "non-diffusible" type which has a hydrophobic group called "ballast group" in the molecule. Couplers may be four- or two-equivalent with respect to silver ion. Colored couplers capable of color correction or DIR couplers which release a development restrainer as a function of development may also be contained in the photographic material. Also useful are couplers that provide a colorless product upon coupling reaction.

The couplers described above may be dispersed by various methods such as dispersion in aqueous alkaline solutions, dispersion in solids, dispersion in latices, or dispersion by forming an oil-in-water type emulsion. Suitable methods may be selected in accordance with the chemical structure of couplers.

The coating solutions to be applied by the present invention may contain various common additives in accordance with a specific object. Exemplary additives that may be used include: stabilizers and antifoggants such as azaindenes, triazoles, tetrazoles, imidazolium salts, tetrazolium salts and polyhydroxy compounds; hardeners such as aldehyde, aziridine, isoxazoles, vinylsulfone, acryloyl, carbodiimide, maleimide, methanesulfonate ester and triazine compounds; development accelerators such as benzyl alcohol and polyoxyethylene compounds; image stabilizers such as chroman, coumaran, bisphenol and phosphite ester compounds; and lubricants such as waxes, glyceride of higher aliphatic acids and higher alcohol esters of higher aliphatic acids. Surfactants may also be used for purposes other than adjusting dynamic surface tension, such as for improving the penetrability of processing solutions, for providing defoaming action, or for controlling various physical properties of the photographic material. The surfactants used for these purposes may be anionic, cationic, nonionic or amphoteric. Effective as antistats are diacetyl celluloso, styrene perfluoroalkyl sodium maleate copolymer, and alkali salts of the reaction product between styrenemaleic anhydride copolymer and p-aminobenzenesulfonic acid. Illustrative matting agents include polymethyl methacrylate, polystyrene and alkali-soluble polymers. Colloidal silicon oxide is also useful. Latices that may be added to provide improved film properties include copolymers of acrylic acid esters or vinyl esters with other monomers having an ethylene group. Suitable gelatin plasticizers include glycerin and glycolic compounds. Exemplary thickeners include styrene-sodium maleate copolymer and alkyl vinyl ether-maleic acid copolymers.

The support of the photographic material of the present invention may be selected from among known materials such as baryta paper, polyolefin coated paper, polyethylene coated paper, synthetic polypropylene paper, collulose acetate, cellulose nitrate, polyvinyl acetal, polypropylene, polyesters such as polyethylene terephthalate, and polystyrene. A suitable support may be selected according to the specific photographic material used. These supports may be subbed as required.

The following examples are provided for the purpose of further illustrating the present invention but are in no way to be taken as limiting.

EXAMPLE 1

For coating solutions having the formulas shown below were applied in superposition on a moving (100 m/min) polyolefin coated paper base by means of a sliding hopper coater, and the resulting sample of photographic material was examined. The coating solutions had a temperature of 38° C.

Coating solutions

1. Silver halide emulsion

Emulsion layer A:Blue-sensitive silver halide emulsion containing a yellow coupler in gelatin.

Emulsion layer B:Green-sensitive silver halide emulsion containing a magenta coupler in gelatin. This also contains surfactant S-1 (see below) in an amount of 0.60 g/L.

2. Intermediate layer:Gelatin layer containing AS (antistain) dispersion and other common additives. This layer also contains surfactant S-2 (see below) in an amount of 0.94 g/L.

3. Topmost layer:Gelatin solution. This solution also contains surfactant S-3 (see below) in an amount of 0.8 g/L.

For viscosity adjustment, thickener V-1 (see below) was used.

Physical properties (static and dynamic surface tensions) of the coating solutions and their wet coating weights were as shown in Table 1.

TABLE 1

| | Dynamic surface tension, dyne/cm | Viscosity, cPs | Coating weight, g/cm$^2$ |
|---|---|---|---|
| Topmost layer | 35 (29) | 25 | 15 |
| Third layer (emulsion layer B) | 40 (40) | 25 | 15 |
| Second layer (intermediate layer) | 42 (36) | 25 | 20 |
| Bottommost layer (emulsion layer A) | 43 (43) | 17 | 35 |

Values of static surface tension are parenthesized in the column of "dynamic surface tension".

In Example 1, the coating solutions could satisfactorily be applied without causing any coating defect such as uneven coating thickness. The resulting photographic material was acceptable.

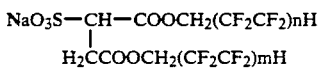

S-1

(n, m = 2 or 2)

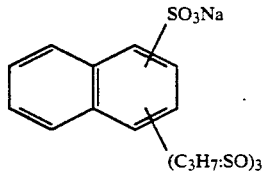

S-2

60% sol.

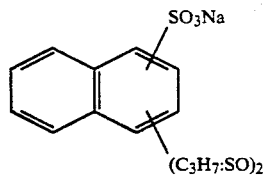

40% sol.

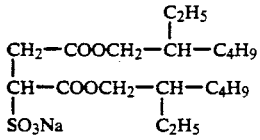

S-3

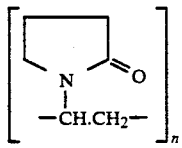

V-1

COMPARATIVE EXAMPLE 1

The procedure of Example 1 was repeated except that the gelatin solution for the topmost layer contained surfactant S-3 in an amount of 0.2 g/L. For viscosity adjustment, thickener V-1 was also used. Physical properties (static and dynamic surface tensions) of the coating solutions and their wet coating weights were as shown in Table 2.

TABLE 2

| | Dynamic surface tension, dyne/cm | Viscosity, cPs | Coating weight, g/cm$^2$ |
|---|---|---|---|
| Topmost layer | 40 (29) | 25 | 15 |
| Third layer (emulsion layer B) | 40 (40) | 25 | 15 |
| Second layer (intermediate layer) | 42 (36) | 25 | 20 |
| Bottommost layer (emulsion layer A) | 43 (43) | 17 | 35 |

Values of static surface tension are parenthesized in the column of "dynamic surface tension".

In Comparative Example 1, repellency spots and other coating defects occurred.

EXAMPLE 2

Four coating solutions having the formulas shown below were applied in superposition on a moving (150 m/min) polyolefin coated paper base by means of a sliding hopper coaster, and the resulting sample of photographic material was examined. The coating solutions had a temperature of 38° C.

Coating solutions

1. Silver halide emulsion

Emulsion layer C1:Red-sensitive silver halide emulsion containing a cyan coupler in gelatin. This emulsion also contains surfactant S-1 in an amount of 0.10 g/L.

2. Bottommost layer: Gelatin layer containing a dispersion of uv absorber and other common additives. This layer also contains surfactant S-2 in an amount of 1.7 g/L.

3. Third layer: Same as the bottommost layer shown above.

4. Topmost layer:Gelatin solution containing surfactant S-3 in an amount of 1.4 g/L.

For viscosity measurement, thickener V-1 was used.

Physical properties (static and dynamic surface tensions) of the coating solutions and their wet coating weights were as shown in Table 3.

TABLE 3

| | Dynamic surface tension, dyne/cm | Viscosity, cPs | Coating weight, g/cm$^2$ |
|---|---|---|---|
| Topmost layer | 30 (28) | 20 | 15 |
| Third layer | 40 (40) | 20 | 22 |
| Second layer (emulsion layer C1) | 42 (37) | 20 | 20 |
| Bottommost layer | 41 (40) | 10 | 35 |

Values of static surface tension are parenthesized in the column of "dynamic surface tension".

In example 2, the coating solutions could satisfactorily be applied without causing any coating defect such as uneven coating thickness. The resulting photographic material was acceptable.

EXAMPLE 3

Four coating solutions having the formulas shown below were applied in superposition on a moving (60 m/min) polyolefin coated paper base by means of a sliding hopper coater, and the resulting sample of photographic material was examined. The coating solutions had a temperature of 40° C.

Coating solutions

First layer (silver halide emulsion): Green-sensitive silver halide emulsion containing a magenta coupler and a silver halide in gelatin.

Second layer (silver halide emulsion): Green-sensitive silver halide emulsion containing a magenta coupler and a silver halide in gelatin.

Third layer (intermediate layer): Gelatin layer containing common additives.

Fourth layer (yellow filter layer): Containing a yellow dye, surfactant, gelatin, etc.

The surfactant used in the silver halide emulsions had the following structural formula:

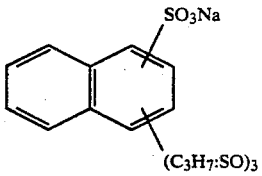

The surfactant used in the intermediate layer and the topmost layer had the following structural formula:

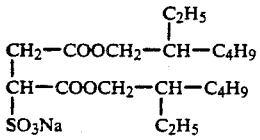

Physical property (dynamic surface tension) of each coating solution and its wet coating weight were as shown in Table 4.

TABLE 4

| | Dynamic surface tension, dyne/cm | Viscosity, cPs | Coating weight, g/cm$^2$ |
|---|---|---|---|
| Fourth layer (topmost layer) | 33 | 15 | $1.5 \times 10^{-3}$ |
| Third layer | 54 | 20 | $1.5 \times 10^{-3}$ |
| Second layer | 44 | 25 | $2.0 \times 10^{-3}$ |
| First layer (bottommost layer) | 41 | 25 | $3.5 \times 10^{-3}$ |

Measurements of dynamic surface tension were conducted by the curtain coating method described herein. In example 3, the number of repellency spots was as small as 0.3 per square meter and the coating solutions could satisfactorily be applied to produce an acceptable photographic material.

In another experiment, the amount of the surfactant in the fourth layer was so adjusted as to prepare a coating solution having the dynamic surface tension shown in Table 5 below.

TABLE 5

| | Dynamic surface tension, dyne/cm | Viscosity, cPs | Coating weight, g/cm$^2$ |
|---|---|---|---|
| Fourth layer (topmost layer) | 40 | 15 | $1.5 \times 10^{-3}$ |
| Third layer | 54 | 20 | $1.5 \times 10^{-3}$ |
| Second layer | 44 | 25 | $2.0 \times 10^{-3}$ |
| First layer (bottommost layer) | 41 | 25 | $3.5 \times 10^{-3}$ |

Measurements of dynamic surface tension were conducted by the curtain coating method described herein. In this experiment, the number of repellency spots was slightly increased to produce somewhat poor results in coating operation.

EXAMPLE 4

Four coating solutions having the formulas shown below were applied in superposition on a moving (60 m/min) polyolefin coated paper base by means of a sliding hopper coater, and the resulting sample of photographic material was examined. The coating solutions had a temperature of 40° C.

Coating solutions

First layer (silver halide emulsion): Green-sensitive silver halide emulsion containing a magenta coupler and a silver halide in gelatin.

Second layer (silver halide emulsion): Green-sensitive silver halide emulsion containing a magenta coupler and a silver halide in gelatin.

Third layer (intermediate layer): Gelatin layer containing common additives.

Fourth layer (yellow filter layer): Containing a yellow dye, surfactant, gelatin, etc.

Physical property (dynamic surface tension) of each coating solution and its wet coating weight were as shown in Table 6.

TABLE 6

| | Dynamic surface tension, dyne/cm | Viscosity, cPs | Coating weight, g/cm$^2$ |
|---|---|---|---|
| Fourth layer (topmost layer) | 30 | 15 | $1.5 \times 10^{-3}$ |
| Third layer | 53 | 20 | $1.5 \times 10^{-3}$ |
| Second layer | 36 | 25 | $2.0 \times 10^{-3}$ |
| First layer (bottommost layer) | 44 | 25 | $3.5 \times 10^{-3}$ |

Measurements of dynamic surface tension were conducted by the curtain coating method described herein. In Example 4, the number of repellency spots was as small as 0.2 per square meter and the coating solutions could satisfactorily be applied to produce an acceptable photographic material.

In another experiment, the amount of the surfactant in the fourth layer was so adjusted as to prepare a coating solution having the dynamic surface tension shown in Table 7 below.

TABLE 7

| | Dynamic surface tension, dyne/cm | Viscosity, cPs | Coating weight, g/cm$^2$ |
|---|---|---|---|
| Fourth layer (topmost layer) | 38 | 15 | $1.5 \times 10^{-3}$ |
| Third layer | 53 | 20 | $1.5 \times 10^{-3}$ |

TABLE 7-continued

| | Dynamic surface tension, dyne/cm | Viscosity, cPs | Coating weight, g/cm$^2$ |
|---|---|---|---|
| Second layer | 36 | 25 | $2.0 \times 10^{-3}$ |
| First layer (bottommost layer) | 44 | 25 | $3.5 \times 10^{-3}$ |

Measurements of dynamic surface tension were conducted by the curtain coating method described herein. In this experiment, the number of repellency spots increased to 1.2 per square meter and satisfactory coating could not be accomplished.

EXAMPLE 5

Four coating solutions having the formulas shown below were applied in superposition on a moving (60 m/min) polyolefin coated paper base by means of a sliding hopper coater, and the resulting sample of photographic material was examined. The coating solutions had a temperature of 40° C.

Coating solutions

First layer (silver halide emulsion): Blue-sensitive silver halide emulsion containing a yellow coupler and a silver halide in gelatin.

Second layer (silver halide emulsion): Blue-sensitive silver halide emulsion containing a yellow coupler and a silver halide in gelatin.

Third layer (intermediate layer): Gelatin layer containing common additives.

Fourth layer (protective layer): Containing a surfactant, gelatin, etc.

Physical property (dynamic surface tension) of each coating solution and its wet coating weight were as shown in Table 8.

TABLE 8

| | Dynamic surface tension, dyne/cm | Viscosity, cPs | Coating weight, g/cm$^2$ |
|---|---|---|---|
| Fourth layer (topmost layer) | 35 | 15 | $1.5 \times 10^{-3}$ |
| Third layer | 54 | 20 | $1.5 \times 10^{-3}$ |
| Second layer | 41 | 25 | $2.0 \times 10^{-3}$ |
| First layer (bottommost layer) | 41 | 25 | $3.5 \times 10^{-3}$ |

Measurements of dynamic surface tension were conducted by the curtain coating method described herein. In Example 5, the number of repellency spots was as small as 0.1 per square meter and the coating solutions could satisfactorily be applied to produce an acceptable photographic material.

In another experiment, the amount of the surfactant in the fourth layer was so adjusted as to prepare a coating solution having the dynamic surface tension shown in Table 9 below.

TABLE 9

| | Dynamic surface tension, dyne/cm | Viscosity, cPs | Coating weight, g/cm$^2$ |
|---|---|---|---|
| Fourth layer (topmost layer) | 38 | 15 | $1.5 \times 10^{-3}$ |
| Third layer | 54 | 20 | $1.5 \times 10^{-3}$ |
| Second layer | 41 | 25 | $2.0 \times 10^{-3}$ |
| First layer | 41 | 25 | $3.5 \times 10^{-3}$ |

TABLE 9-continued

| | Dynamic surface tension, dyne/cm | Viscosity, cPs | Coating weight, g/cm$^2$ |
|---|---|---|---|
| (bottommost layer) | | | |

Measurements of dynamic surface tension were conducted by the curtain coating method described herein. In this experiment, the number of repellency spots was slightly increased to produce somewhat poor results in coating operation.

EXAMPLE 6

Six coating solutions having the formulas shown below were applied in superposition on a moving (60 m/min) polyolefin coated paper base by means of a sliding hopper coater, and the resulting sample of photographic material was examined. The coating solutions had a temperature of 40° C.

Coating solutions

First layer (silver halide emulsion): Green-sensitive silver halide emulsion containing a magenta coupler and a silver halide in gelatin.

Second layer (silver halide emulsion): Green-sensitive silver halide emulsion containing a magenta coupler and a silver halide in gelatin.

Third layer (yellow filter layer): Containing a yellow dye, a surfactant, gelatin, etc.

Fourth layer (silver halide emulsion): Blue-sensitive silver halide emulsion containing a yellow coupler and a silver halide in gelatin.

Fifth layer (intermediate layer): Containing gelatin, etc.

Sixth layer (protective layer): Containing a surfactant, gelatin, etc.

Physical property (dynamic surface tension) of each coating solution and its wet coating weight were as shown in Table 10.

TABLE 10

| | Dynamic surface tension, dyne/cm | Viscosity, cPs | Coating weight, g/cm$^2$ |
|---|---|---|---|
| Sixth layer (topmost layer) | 31 | 15 | $1.5 \times 10^{-3}$ |
| Fifth layer | 41 | 25 | $2.0 \times 10^{-3}$ |
| Fourth layer | 42 | 25 | $3.5 \times 10^{-3}$ |
| Third layer | 54 | 15 | $1.5 \times 10^{-3}$ |
| Second layer | 37 | 25 | $2.0 \times 10^{-3}$ |
| First layer (bottommost layer) | 40 | 25 | $3.5 \times 10^{-3}$ |

Measurements of dynamic surface tension were conducted by the curtain coating method described herein. In Example 6, the number of repellency spots was as small as 0.1 per square meter and the coating solutions could satisfactorily be applied to produce an acceptable photographic material.

For comparison, the amount of the surfactant in the sixth layer was so adjusted as to prepare a coating solution having the dynamic surface tension shown in Table 11 below.

TABLE 11

| | Dynamic surface tension, dyne/cm | Viscosity, cPs | Coating weight, g/cm$^2$ |
|---|---|---|---|
| Sixth layer | 42 | 15 | $1.5 \times 10^{-3}$ |

TABLE 11-continued

| | Dynamic surface tension, dyne/cm | Viscosity, cPs | Coating weight, g/cm$^2$ |
|---|---|---|---|
| (topmost layer) | | | |
| Fifth layer | 41 | 25 | $2.0 \times 10^{-3}$ |
| Fourth layer | 42 | 25 | $3.5 \times 10^{-3}$ |
| Third layer | 54 | 15 | $1.5 \times 10^{-3}$ |
| Second layer | 37 | 25 | $2.0 \times 10^{-3}$ |
| First layer | 40 | 25 | $3.5 \times 10^{-3}$ |
| (bottommost layer) | | | |

Measurements of dynamic surface tension were conducted by the curtain coating method described herein. In this comparative experiment, the number of repellency spots increased to 3.4 per square meter and satisfactory coating operation could not be performed.

In another comparative experiment, the amount of the surfactant in the third layer was so adjusted as to prepare a coating solution having the dynamic surface tension shown in Table 12 below.

TABLE 12

| | Dynamic surface tension, dyne/cm | Viscosity, cPs | Coating weight, g/cm$^2$ |
|---|---|---|---|
| Sixth layer (topmost layer) | 42 | 15 | $1.5 \times 10^{-3}$ |
| Fifth layer | 41 | 25 | $2.0 \times 10^{-3}$ |
| Fourth layer | 42 | 25 | $3.5 \times 10^{-3}$ |
| Third layer | 40 | 15 | $1.5 \times 10^{-3}$ |
| Second layer | 37 | 25 | $2.0 \times 10^{-3}$ |
| First layer (bottommost layer) | 40 | 25 | $3.5 \times 10^{-3}$ |

Measurements of dynamic surface tension were conducted by the curtain coating method described herein. In this second comparative experiment, the number of repellency spots increased to 1.3 per square meter and no satisfactory coating operation could be achieved.

As described on the foregoing pages, the present achieves substantial improvements in the coating quality, particularly with respect to evenness of coating thickness and elimination of repellency spots, by performing multi-layered bead coating with the dynamic surface tension of liquid coating layers being taken into account as an essential parameter to be controlled in addition to such factors as castability and the formation of superposed bead films.

What is claimed is:

1. In a process for producing a photographic material by coating an assembly of superposed liquid photographic layers onto the surface of a moving base support, the improvement wherein said assembly comprises at least three superposed liquid photographic layers in which the dynamic surface tension is substantially inverted in a certain intermediate layer of the assembly, a peak dynamic surface tension occurs in said certain intermediate layer with the difference between said peak and the dynamic surface tension of any adjacent layer being at least 3 dynes/cm; and the topmost layer of said assembly is formed of a coating solution that has a lower dynamic surface tension than the coating solutions for any other layers of the assembly by at least 5 dynes/cm.

2. The process according to claim 1 wherein said liquid layers are formed of a gelatin solution.

3. The process according to claim 1 wherein said dynamic surface tensions are adjusted with an anionic or nonionic surfactant.

4. The process according to claim 1 which is implemented by a sliding hopper coating method.

5. The process according to claim 1 wherein said photographic material is a color photographic material.

* * * * *